United States Patent [19]
Hinchey et al.

[11] Patent Number: 5,999,541
[45] Date of Patent: Dec. 7, 1999

[54] TRANSMISSION OF TOKEN-RING PACKETS OVER ETHERNET BY TUNNELING

[75] Inventors: Kevin Hinchey, Northborough; Timothy A. Mancour, Wrentham, both of Mass.

[73] Assignee: 3COM Corporation, Santa Clara, Calif.

[21] Appl. No.: 08/807,267

[22] Filed: Feb. 28, 1997

[51] Int. Cl.[6] .................................................. H04L 12/56
[52] U.S. Cl. ........................................... 370/466; 370/474
[58] Field of Search ..................................... 370/389, 392, 370/401, 402, 403, 404, 405, 465, 466, 467, 469, 470, 474; 395/200.6, 200.61, 200.62, 200.66, 200.68, 200.75, 200.76, 200.79, 200.81

[56] References Cited

U.S. PATENT DOCUMENTS

| | | | |
|---|---|---|---|
| 4,926,420 | 5/1990 | Shimizu | 370/471 |
| 5,088,032 | 2/1992 | Bosack | 395/200 |
| 5,088,090 | 2/1992 | Yacoby | 370/85.13 |
| 5,095,480 | 3/1992 | Fenner | 370/94.1 |
| 5,214,646 | 5/1993 | Yacoby | 370/85.14 |
| 5,305,317 | 4/1994 | Szczepanek | 370/85.5 |
| 5,317,568 | 5/1994 | Bixby et al. | 370/85.6 |
| 5,349,583 | 9/1994 | Christensen et al. | 370/85.5 |
| 5,390,173 | 2/1995 | Spinney et al. | 370/393 |
| 5,394,402 | 2/1995 | Ross | 370/393 |
| 5,426,637 | 6/1995 | Derby et al. | 370/85.13 |
| 5,428,615 | 6/1995 | Backes et al. | 370/85.13 |
| 5,434,864 | 7/1995 | Perlman et al. | 370/392 |
| 5,444,856 | 8/1995 | Bowers et al. | 395/200.1 |
| 5,448,565 | 9/1995 | Chang et al. | 370/85.13 |
| 5,450,407 | 9/1995 | Perlman et al. | 370/85.13 |
| 5,453,980 | 9/1995 | Van Engelshoven | 370/60.1 |
| 5,471,472 | 11/1995 | McClure et al. | 370/402 |
| 5,473,608 | 12/1995 | Gagne et al. | 370/85.13 |
| 5,485,455 | 1/1996 | Dobbins et al. | 370/60 |
| 5,490,252 | 2/1996 | Macera et al. | 395/200.01 |
| 5,509,000 | 4/1996 | Oberlander | 370/17 |
| 5,510,920 | 4/1996 | Ota | 359/121 |
| 5,519,704 | 5/1996 | Farinacci et al. | 370/85.13 |
| 5,535,373 | 7/1996 | Olnowich | 395/500 |
| 5,548,731 | 8/1996 | Chang et al. | 395/280 |
| 5,550,803 | 8/1996 | Crayford et al. | 370/246 |
| 5,560,038 | 9/1996 | Haddock | 395/800 |
| 5,566,170 | 10/1996 | Bakke et al. | 370/60 |
| 5,568,471 | 10/1996 | Hershey et al. | 370/17 |
| 5,572,582 | 11/1996 | Riddle | 379/202 |
| 5,651,002 | 7/1997 | Van Seters et al. | 370/392 |
| 5,740,374 | 4/1998 | Raffali-Schreinemachers | 395/200.68 |
| 5,742,604 | 4/1998 | Edsall et al. | 370/401 |
| 5,781,534 | 7/1998 | Perlman et al. | 370/248 |

*Primary Examiner*—Chi H. Pham
*Assistant Examiner*—Kwang B. Yao
*Attorney, Agent, or Firm*—Weingarten, Schurgin, Gagnebin & Hayes LLP

[57] ABSTRACT

Token Ring network packet having a header and an information field is prepared for transmission over an Ethernet network by the steps of removing the header information from the Token Ring packet, and associating a second header with the information field of the Token Ring packet, wherein the second header is compatible with the Ethernet network. More particularly, to prepare an IEEE 802.5 Token Ring network packet for transmission on an Ethernet network the Access Control ("AC") and Frame Control ("FC") fields are removed, the order of the destination address ("DA") field is reversed, the order of the source address ("SA") field is reversed, a Virtual Local Area Network ("VLAN") type field is added, a VLAN identification ("ID") field is added, and a length value field is added. The information field from the Token Ring packet is retained. However, if the newly formed tunneled packet would otherwise be smaller than the minimum size for an Ethernet packet the information field may be padded with null bits until the minimum size for an Ethernet packet is achieved.

43 Claims, 4 Drawing Sheets

NATIVE TOKEN RING TO TUNNELED TOKEN RING

TRANSMISSION OF TOKEN-RING PACKETS OVER ETHERNET BY TUNNELING

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is generally related to telecommunications, and in particular to data transmission across different types of computer networks.

A need exists to efficiently transmit Token Ring packets on an Ethernet network. Token Ring is a well established protocol which enjoys wide usage. One drawback of Token Ring networks compliant with the IEEE 802.5 standard is lack of bandwidth. In particular, Token Ring networks operate at 4 or 16 Mbps in comparison with more recent technologies such as Fast Ethernet, Fiber Distributed Data Interface ("FDDI") and Asynchronous Transfer Mode ("ATM") networks. One way to extend the useful life of existing Token Ring networks is to integrate such networks with other networks such as Fast Ethernet, FDDI and ATM in a manner which takes advantage of the increased bandwidth of those other networks.

Technology for transmission of data across different types of computer networks is known. For example, U.S. Pat. No. 5,535,373, entitled PROTOCOL-TO-PROTOCOL TRANSLATOR FOR INTERFACING DISPARATE SERIAL NETWORK NODES TO A COMMON PARALLEL SWITCHING NETWORK, issued to Olnowich describes translation of data units from a first network protocol to a second network protocol. Initially, the network operating system protocol of the sending network is identified. The data unit is then modified based upon known characteristics of the sending network operating system protocol such that the data unit is placed in a format that can be handled by equipment in the receiving network. However, such data unit translation requires intensive computations, and hence necessitates the use of relatively sophisticated and costly electronic hardware. Further, since some network operating system protocols are proprietary, the technique for making the translation may change each time the operating system protocol is changed, thereby necessitating development and distribution of updated translation tools.

It is also known to encapsulate a first data unit of a first protocol inside a second data unit of a second protocol. To encapsulate a Token Ring packet in an Ethernet packet, the entire Token Ring packet including both header information and payload is stored in the information field of the Ethernet packet. Header information for the Ethernet packet, such as source and destination addresses, must then be determined for the Ethernet packet. However, encapsulation has the disadvantage of producing a relatively large packet because a minimum of 16 bytes are added.

With regard to transmission of Token Ring packets on an Ethernet network, a commercially available product known as "VG-AnyLAN" supplied by the Hewlett-Packard Corporation is known to exist. However, VG-AnyLAN does not allow coexistence of Token Ring packets and Ethernet packets on the same network segment.

BRIEF SUMMARY OF THE INVENTION

In accordance with the present invention, a first network packet having a header and an information field is prepared for transmission over a second network by the steps of removing the header information from the first network packet, and associating a second header with the information field of the first packet, wherein the second header is compatible with the second network. To prepare an IEEE 802.5 Token Ring network packet for transmission on an Ethernet network the Access Control ("AC") and Frame Control ("FC") fields are removed, the order of the destination address ("DA") field is reversed, the order of the source address ("SA") field is reversed, a Virtual Local Area Network ("VLAN") type field is added, a VLAN identification ("ID") field is optionally added, and a length value field is added. The information field from the Token Ring packet is retained. However, if the newly formed tunneled packet would otherwise be smaller than the minimum size for an Ethernet packet, i.e., 64 bytes, the information field may be padded with null bits until the minimum size for an Ethernet packet is achieved. The resulting tunneled packet has the desirable qualities of requiring less computation than complete translation and not increasing the packet size as in encapsulation.

One advantage of the tunneled Token Ring packets is compatibility with native Ethernet packets. In particular, the fields of the tunneled Token Ring packet function similarly to corresponding fields in native Ethernet packets. Tunneled Token Ring packets can therefore coexist with native Ethernet packets on a network segment, and can be efficiently handled by Ethernet networking equipment.

Another advantage of the tunneled Token Ring packets is retention of source routing ability. The Token Ring protocol supports source routing. However, the Ethernet protocol does not support source routing. Tunneled Token Ring packets retain the information necessary to implement source routing. Hence, when a native Token Ring packet is created from a tunneled Token Ring packet, the original source routing information may be employed.

BRIEF DESCRIPTION OF THE DRAWING

The foregoing features of this invention, as well as the invention itself, may be more fully understood from the following detailed description in conjunction with the drawing, of which.

DETAILED DESCRIPTION OF THE INVENTION

Figure 1:
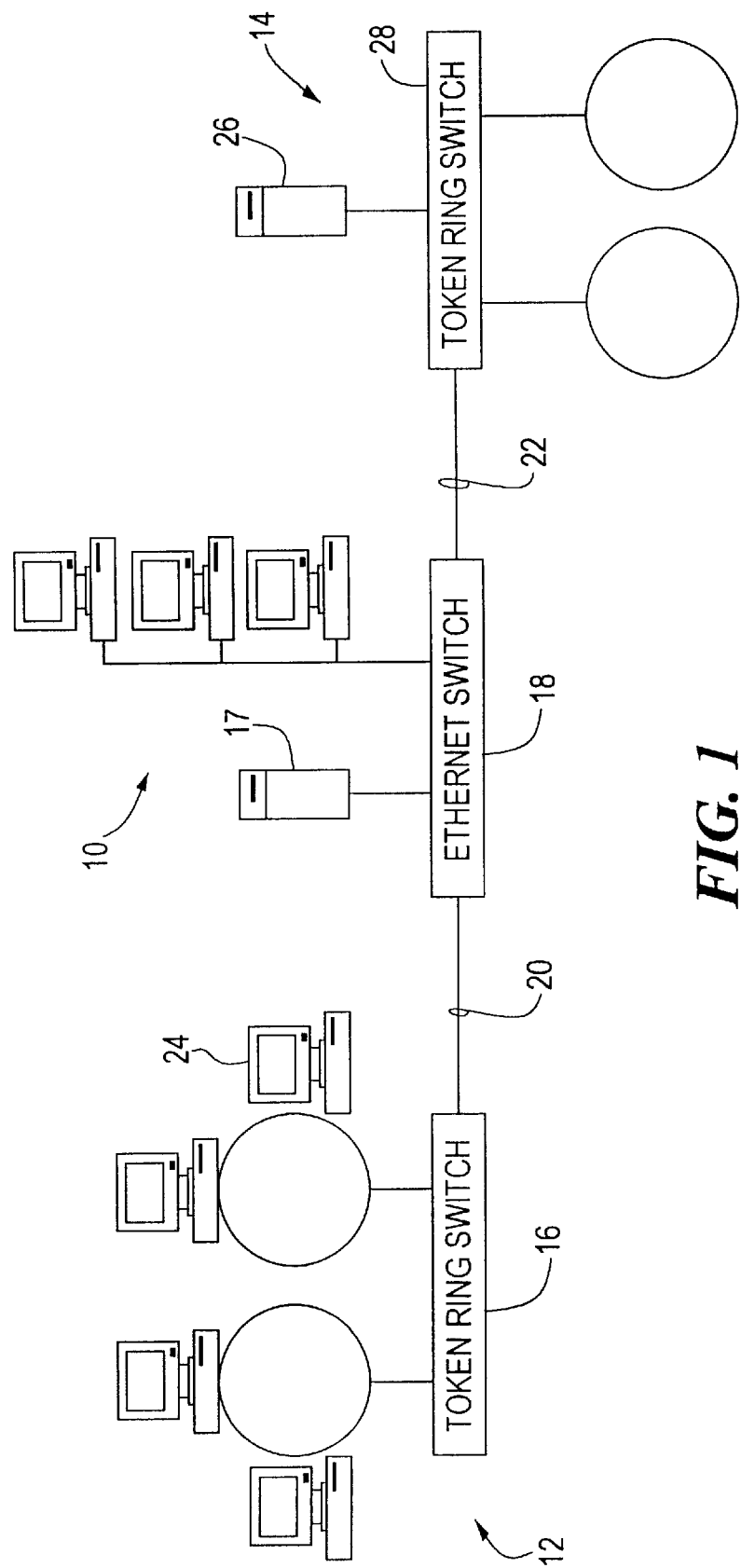
FIG. 1 is a block diagram which illustrates an architecture in which packets from a Token Ring network may be transmitted through an Ethernet network to another Token Ring network.

FIG. 1 illustrates an exemplary architecture in which an Ethernet Local Area Network ("LAN") facilitates communication between Token Ring LANs 12, 14. A 16 Mbps Token Ring LAN 12 including a Token Ring switch 16 is connected to a 100 Mbps Fast Ethernet LAN 10 including a server 17 and a switch 18 through an Ethernet link 20. The Ethernet switch is connected to a second 16 Mbps Token Ring LAN 14 by a second Ethernet link 22. In order for a client computer 24 connected to the Token Ring switch 16 to communicate with a server 26 connected to the second Token Ring switch 28, Token Ring packets generated by the client 24 must be prepared for transmission on the Ethernet LAN 10. The Token Ring packets are preferably prepared by placing the packets in a form which can coexist with native Ethernet packets. The modified packets are then transmitted over the Ethernet LAN and modified a second time to place the packets back in native Token Ring format for transmission on the second Token Ring LAN 14.

Figure 2:
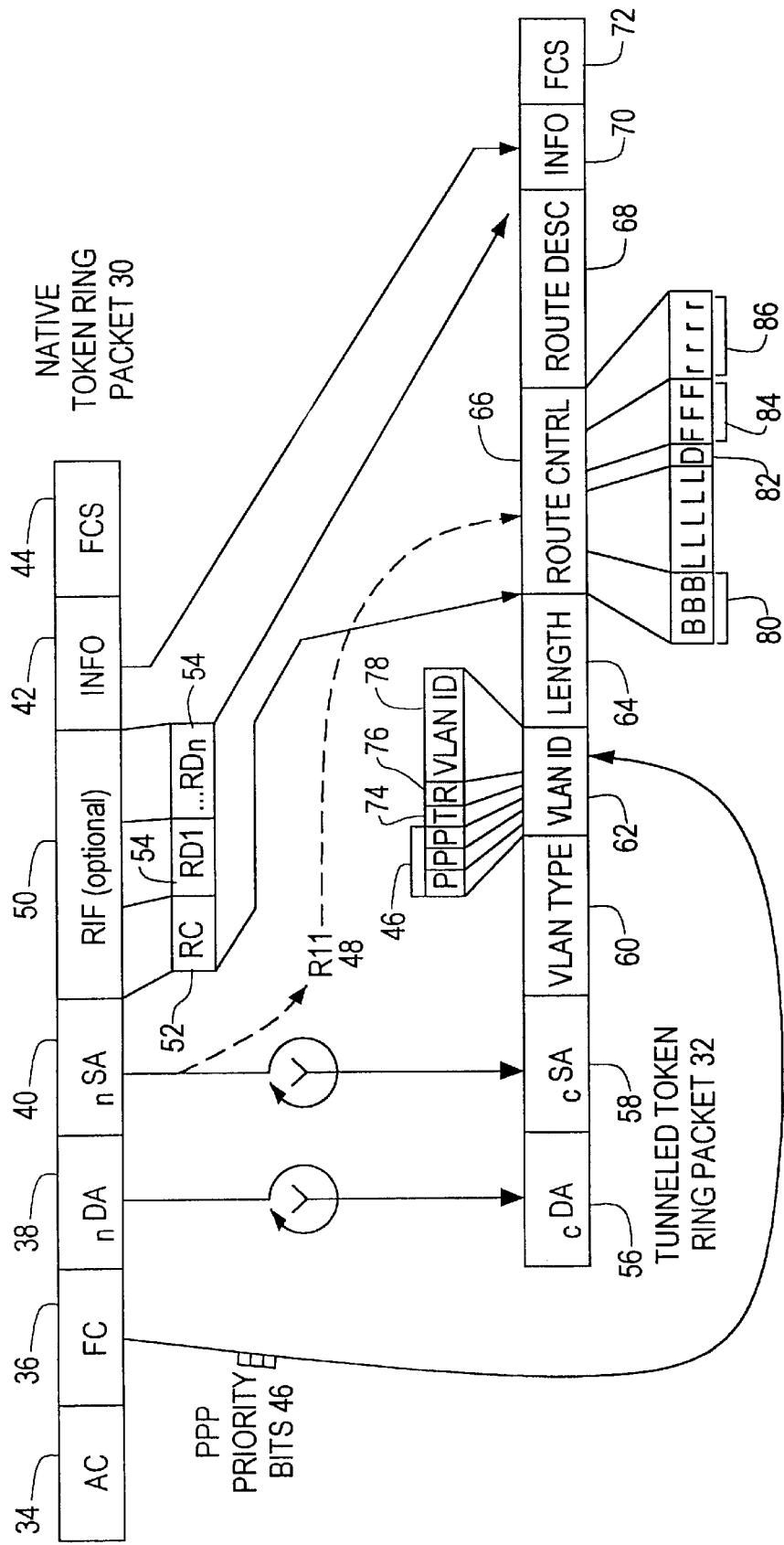
FIG. 2 is a block diagram of a Token Ring packet and an Ethernet packet formed from the Token Ring packet ("tunneled Token Ring packet")

FIG. 2 illustrates a native Token Ring packet 30 and a tunneled Token Ring packet 32 generated therefrom. The native Token Ring packet 30 includes an access control ("AC") field 34 (1 octet), a frame control ("FC") field 36 (1 octet), a non-canonical destination address ("nDA") field 38 (2 or 6 octets), a non-canonical source address ("nSA") field 40 (2 or 6 octets), an information field 42, and a frame-check sequence ("FCS") field 44 (4 octets). The information field holds the data payload of the packet, and all other fields are referred to collectively as the packet "header." The FC field 36 includes at least three priority bits PPP 46 and the nSA field 40 includes a routing information indicator RII 48. If the native Token Ring packet 30 is source routed, the RII 48 will be set and the packet will also include a route information field 50 ("RIF"). The RIF 50 includes a Route Control ("RC") field 52 (2 bytes) and Route Descriptor ("RD") fields 54 (2 bytes each). If the packet is not source routed, the RIF 50 is not present.

The tunneled Token Ring packet 32, which can coexist with native Ethernet packets, includes a canonical DA field 56, a canonical SA field 58, a virtual local area network ("VLAN") type field 60 (2 bytes), a VLAN identification ("ID") field 62 (2 bytes), a length field 64, a route control field 66, a route descriptor field 68, an information field 70 and an FCS field 72. The VLAN type field 60 is employed as an indicator that the packet is a tunneled Token Ring packet. The VLAN ID field 62 includes the three priority bits PPP 46, a token ring bit T 74, a reserved bit R 76 and eleven bits of VLAN ID 78. The length field 64 is employed to indicate the size of the native Token Ring packet. The route control field 66 includes three broadcast indicator bits BBB 80, a direction bit D 82, three max frame size bits FFF 84 and four reserved bits rrrr 86. It should be noted that six max frame size bits could be employed and accommodated.

In order to modify the native IEEE 802.5 Token Ring packet 30 to create the tunneled Token Ring packet 32, the 30 header is removed from the native Token Ring packet and a new header is associated with the information field of the native Token Ring packet, such that the new header is compatible with the Ethernet protocol. In particular, the AC field 34 and FC field 36 are removed, the bits of the DA field 38 within each byte are reversed in order, the bits of the SA field 40 within each byte are reversed in order, the VLAN type field 60 is added, the VLAN ID field 62 is added, and the length field 64 is added. The information field 42 from the Token Ring packet is retained.

Figure 3:
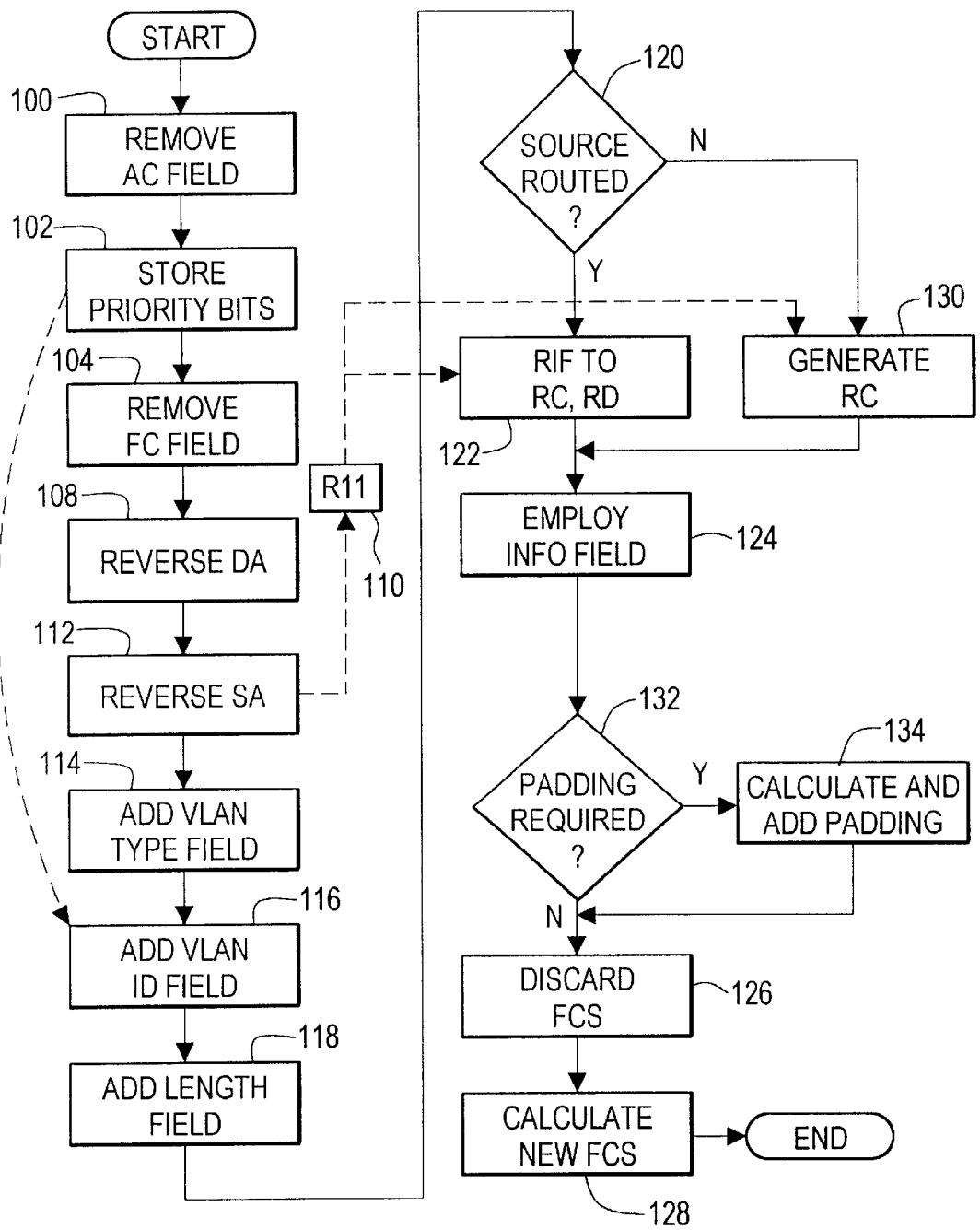
FIG. 3 is a flow diagram which illustrates steps for preparing a Token Ring packet for transmission in an Ethernet network.

Referring now to FIGS. 2 and 3, to create a tunneled Token Ring packet from a native Token Ring packet the AC field is initially removed in step 100. The FC field contains three priority bits which are temporarily stored for subsequent placement in the VLAN ID field in step 102. The remaining bits of the FC field are then removed in step 104. The position of the remaining DA bits are then reversed in step 108, one byte at a time, until the order of the DA field is reversed. The SA field contains a routing information indicator RII which is extracted in step 110 and employed to set bits BBB in the Route Control field. If the RII is set, then the RIF field is present. Contemporaneously with step 110, the position of the remaining SA bits are reversed in step 112, one byte at a time, until the order of the SA field is reversed. The VLAN type field is then added in step 114 by inserting a predetermined value such as 3C20 (hex). The predetermined value serves as an indicator to network devices that the packet is a tunneled Token Ring packet, and that the VLAN ID field should be examined. The VLAN ID field is then optionally added in step 116 by storing the three FC priority bits PPP as the first three bits, followed by the Token Ring indicating bit T and the reserved bit R, followed by 11 bits of VLAN identification. Alternatively, the three priority bits may be stored in the route control field. In step 118 the length field is added to indicate the size of the native Token Ring packet, and hence which data in the Information field is valid. In particular, a value is entered in the length field indicating the size of the RIF field plus the Information field. The length value is salient because the Information field may be padded with null bits. Next, the native Token Ring packet is determined to be either source routed or non-source routed in step 120.

If the native Token Ring packet is source routed, the RIF field is entered in the Route Control and Route Descriptor fields in step 122. The broadcast indicators BBB are set as follows: 00x indicates a specifically routed packet, 10x indicates an all routes explorer, and 11x indicates a spanning tree explorer/single route broadcast. If the Native Token Ring packet is not source routed, route control bytes are generated in step 130 to indicate that the packet is not source routed. The broadcast indicators BBB are set as follows: 01x The native Token Ring information field is then used in step 124, unchanged, as the information field in the tunneled Token Ring packet.

In step 132 the size of the resulting tunneled Token Ring packet is determined. If the resulting tunneled Token Ring packet is at least as large as the minimum Ethernet packet size, the process is complete and flow ends. If the resulting tunneled Token Ring packet is smaller than the minimum allowable Ethernet packet size, the information field is padded in step 134 with null bits such that the tunneled Token Ring packet becomes at least as large as the minimum Ethernet packet size. The padding routine operates as follows:

```
If (source routed)
    If (TR length < 60)
        padding = 60 - TR length
    Else
        padding = 0
Else
    If (TR length < 58)
        padding = 58 - TR length
    Else
        padding = 0
```

If the length of a source routed Token Ring packet is less than 60 bytes, the length field is padded with (60—Token Ring length) null bytes. Otherwise, if the length of the source routed Token Ring packet is greater than or equal to 60 then the length field is not padded. If the length of a non-source routed Token Ring packet is less than 58 bytes, the length field is padded with (58—Token Ring length) null bytes. Otherwise, if the length of the non-source routed Token Ring packet is greater than or equal to 58 then the length field is not padded. Since a four byte cyclic redundancy check ("CRC") is included, the result is the minimum Ethernet packet size of 64 bytes.

The native Token Ring FCS is then discarded in step 126, and a new FCS field is calculated for the tunneled Token Ring packet in step 128.

Figure 4:
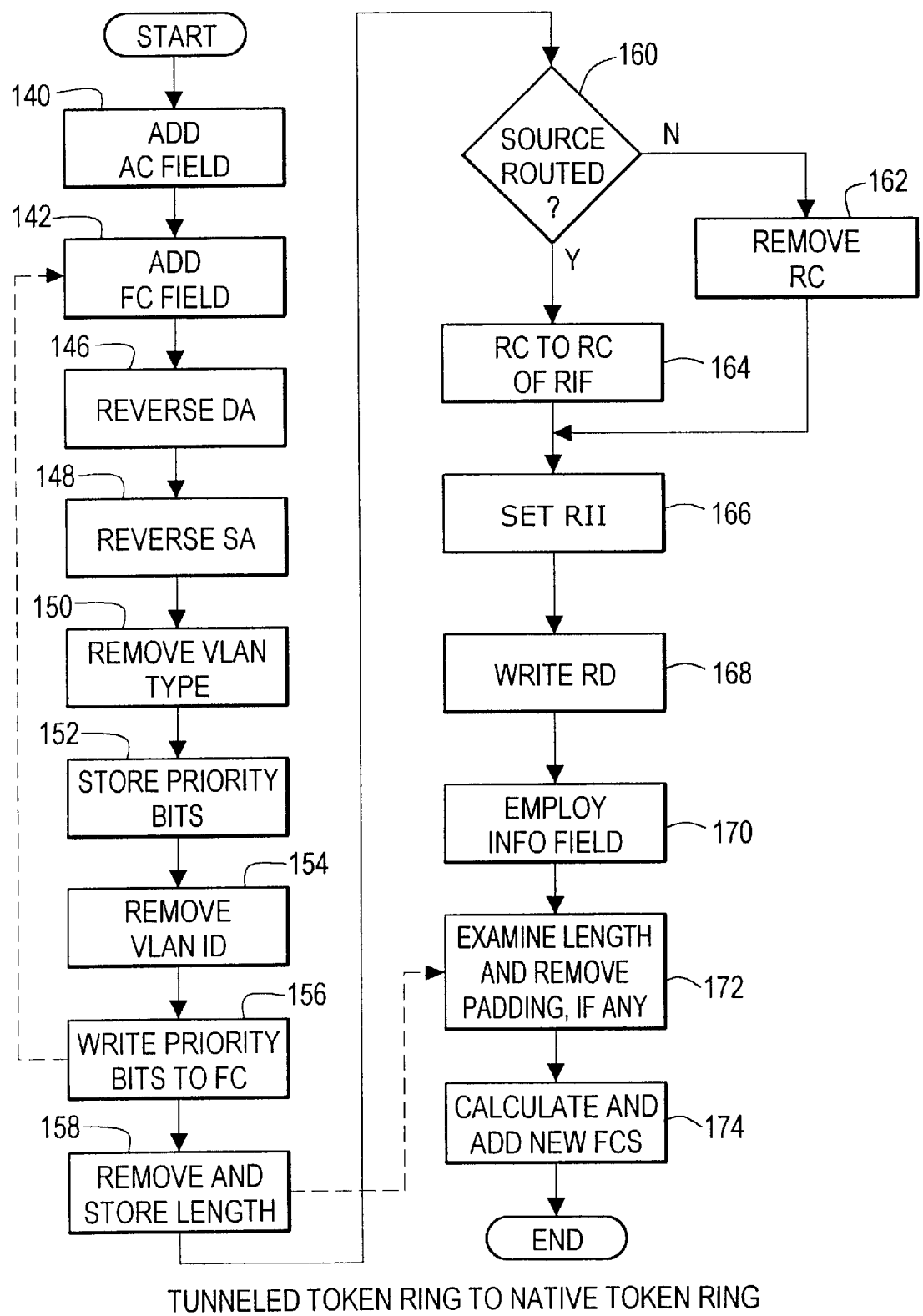
FIG. 4 is a flow diagram which illustrates steps for preparing a tunneled Token Ring packet for transmission on a Token Ring Network.

The steps for generating a native Token Ring packet from the tunneled Token Ring packet are illustrated in FIG. 4. Initially, an AC field and an FC field are added to the packet in steps 140, 142, respectively. The order of the Destination Address field is reversed in step 146. The order of the Source Address field is reversed in step 148. The VLAN Type field is then removed in step 150. The priority bits in the VLAN ID field are then temporarily stored in step 152, and the remaining portion of the VLAN ID field are removed in step 154. The priority bits are then written into the FC field in step 156. The length field is then removed and temporarily stored in step 158, following which the RC field is examined in step 160. If the RC field indicates that the packet is not source routed, then the RC field is removed in step 162. If the RC field indicates that the packet is source routed, the RC field is employed in step 164 as the RC field of the RIF of the Token Ring packet. The RII bit is then set to logic 1 in step 166 and the RD is written to the RIF in step 168. The information field of the tunneled Token Ring packet is utilized as the information field of the native Token Ring packet in step 170. The length field is then examined in step 172 to determine if the information field was padded. If the information field was padded, the padding bits are removed. If the information field was not padded, the information field is left intact. Finally, a new FCS is calculated for the native Token Ring packet in step 174.

Having described the preferred embodiments of the invention, other embodiments which incorporate the concepts of the invention will now become apparent to one of skill in the art. Therefore, the invention should not be viewed as limited to the disclosed embodiments but rather should viewed as limited only by the spirit and scope of the appended claims.

We claim:

1. A method for converting a first network protocol packet to a second network protocol compatible packet for transmission on a second network protocol segment running a second network protocol, comprising:

modifying a header portion of the first network protocol packet to generate a modified header that is compatible with the second network protocol, wherein the header portion of the first network protocol packet includes an Access Control field, a Frame Control field with at least three priority bits, a Source Address field with a Routing Information Indicator bit and a first Frame Check Sequence field, and wherein the modified header includes a modified Source Address field, a VLAN Identification field, a Length field, a Route Control field, a Route Descriptor field, a new Frame Check Sequence field, and a VLAN type field, the VLAN type field having a predetermined value stored therein, the predetermined value indicating that the second network protocol compatible packet has been converted from the first network protocol packet, and wherein the modifying step includes removing the Access Control field from the header portion of the first network protocol packet;

preserving the data portion of the first network protocol packet as the data portion of the second network protocol compatible packet; and associating the modified header with the second network protocol compatible packet data portion to generate the second network protocol compatible packet, whereby the second network protocol compatible packet may be transmitted on the second network protocol segment.

2. The method of claim 1 wherein the associating step includes the further step of padding the second network protocol compatible data portion with null bits until the second network protocol compatible packet is compatible with second network protocol size requirements.

3. The method of claim 2 wherein the second network protocol segment is connected to a third segment running the first network protocol, and including the further step of modifying the header portion of the second network protocol compatible packet to generate a header that is compatible with the first network protocol, removing any existing padding bits from the data portion and transmitting a resultant second network protocol compatible packet on the third segment.

4. The method of claim 1 including the further step of preserving source routing information from the header portion of the first network protocol packet in the modified header.

5. The method of claim 1 wherein the modifying step includes the further step of storing the priority bits of the Frame Control field in the VLAN Identification field.

6. The method of claim 5 wherein the modifying step includes the further step of reversing the order of each bit in each byte of the Destination Address field of the first network protocol packet to provide the Destination Address field of the second network protocol compatible packet.

7. The method of claim 6 wherein the modifying step includes the further step of removing the Routing Information Indicator from the Source Address field and reversing the order of each remaining bit in each byte of the Source Address field to create the modified Source Address field.

8. The method of claim 7 wherein the modifying step includes the further step of adding the VLAN Type field.

9. The method of claim 8 wherein the modifying step includes the further step of adding the VLAN Identification field.

10. The method of claim 9 wherein the modifying step includes the further step of adding the Length field.

11. The method of claim 10 wherein the modifying step includes the further step of determining whether the first network protocol packet is source routed.

12. The method of claim 11 wherein the first network protocol packet includes a Routing Information Field with a route control field and route descriptor fields, and the modifying step includes the further step of employing the route control field of the Routing Information Field as the Route Control field of the second network protocol packet and employing the route descriptors of the Routing Information field as the Route Descriptor field of the second network protocol packet, provided the first network protocol packet is determined to be source routed.

13. The method of claim 11 wherein the modifying step includes the further step of employing the Routing Information Indicator of the first network protocol packet Source Address field to generate the Route Control field of the second network protocol packet, provided the first network protocol packet is determined not to be source routed.

14. The method of claim 13 wherein the employing step includes the further step of generating a three bit broadcast indicator field to indicate whether the first network protocol packet is source routed.

15. The method of claim 11 wherein the modifying step includes the further step of removing the Frame Check Sequence field and generating the new Frame Check Sequence field.

16. A method for conveying a Token Ring packet from a Token Ring network segment to an Ethernet network segment containing a plurality of Ethernet packets each with a respective destination address field by generating an Ethernet compatible packet from the Token Ring packet, the Token Ring packet including an information field and a header portion with an Access Control field, a Frame Control field with at least three priority bits, a Destination Address field, a Source Address field with a Routing Information Indicator bit and a first Frame Check Sequence field, comprising the steps of:

modifying the Token Ring header portion to generate a modified header portion that is Ethernet compatible, the modified header including a modified Source Address field, a VLAN Identification field, a Length field, a Route Control field, a Route Descriptor field, a new Frame Check Sequence field, and a VLAN type field, wherein the VLAN type field includes a predetermined value stored therein, the predetermined value indicating that the Ethernet compatible packet has been converted from the Token Ring packet, and wherein the modifying step includes removing the Access Control field from the Token Ring packet;

preserving the Information field of the Token Ring packet as an Ethernet compatible Information field;

associating the modified header portion with the Ethernet compatible Information field to generate the Ethernet compatible packet; and transmitting the Ethernet compatible packet on the Ethernet network segment.

17. The method of claim 16 wherein the associating step includes the further step of padding the Ethernet compatible Information field with null bits until the Ethernet compatible packet is compatible with Ethernet minimum size requirements.

18. The method of claim 16 including the further step of preserving source routing information from the header portion of the Token Ring packet in the Ethernet compatible header.

19. The method of claim 18 wherein the Ethernet network segment is connected to a third segment running the Token Ring network protocol, and including the further step of modifying the header portion of the Ethernet compatible packet to generate a header that is compatible with the Token Ring network protocol, removing any existing padding bits from the Information field and transmitting a resultant Token Ring network protocol compatible packet on the third segment.

20. The method of claim 16, wherein the modifying step includes the further step of storing the at least three priority bits of the Frame Control field in the VLAN Identification field and then removing the Frame Control field.

21. The method of claim 20 wherein the modifying step includes the further step of reversing the order of each bit within each byte of the Token Ring Destination Address field to create the Destination Address field of the Ethernet compatible packet.

22. The method of claim 21 wherein the modifying step includes the further step of removing the Routing Information Indicator from the Source Address field and reversing the order of each remaining bit of the Source Address field to create the modified Source Address field.

23. The method of claim 22 wherein the modifying step includes the further step of adding the VLAN Type field.

24. The method of claim 23 wherein the modifying step includes the further step of adding the VLAN Identification field.

25. The method of claim 24 wherein the modifying step includes the further step of adding the Length field.

26. The method of claim 25 wherein the modifying step includes the further step of determining whether the Token Ring packet is source routed.

27. The method of claim 26 wherein the Token Ring packet includes a Routing Information Field with a route control field and route descriptor fields, and the modifying step includes the further step of employing the route control field of the Routing Information Field as the Route Control field of the Ethernet compatible packet and employing the route descriptors of the Routing Information field as the Route Descriptor field of the Ethernet compatible packet, provided the Token Ring packet is determined to be source routed.

28. The method of claim 26 wherein the modifying step includes the further step of employing the Routing Information Indicator of the Token Ring packet Source Address field to generate the Route Control field of the Ethernet compatible packet, provided the Token Ring packet is determined not to be source routed.

29. The method of claim 26 wherein the employing step includes the further step of generating a three bit broadcast indicator field to indicate whether the Token Ring packet is source routed.

30. The method of claim 29 wherein the modifying step includes the further step of removing the Frame Check Sequence field and generating the new Frame Check Sequence field.

31. An interface circuit having a driver for creating an Ethernet compatible packet from a Token Ring packet from a Token Ring network segment for transmission on an Ethernet network segment containing Ethernet packets, the Token Ring packet including an information field and a header portion with an Access Control field, a Frame Control field with at least three priority bits, a Destination Address, a Source Address field with a Routing Information Indicator bit and a Frame Check Sequence field, comprising:

a first function that modifies the Token Ring header portion to generate a modified header portion that is Ethernet compatible, the modified header including a modified Source Address field, a VLAN Identification field, a Length field, a Route Control field, a Route Descriptor field, a new Frame Check Sequence field, and a VLAN type field, the VLAN type field having a predetermined value stored therein, the predetermined value indicating that the Ethernet compatible packet has been converted from the Token Ring packet, and wherein the first function removes the Access Control field from the Token Ring packet;

wherein the first function pads the Ethernet compatible Information field with null bits until the Ethernet compatible packet is compatible with Ethernet minimum size requirements;

a second function that preserves the Information field of the Token Ring packet as an Ethernet compatible Information field; and a third function that associates the modified header portion with the Ethernet compatible Information field to generate an Ethernet compatible packet, whereby the Ethernet compatible packet may be transmitted on the Ethernet network segment and coexist with native Ethernet packets.

32. The interface circuit of claim 31 wherein the first function stores the at least three priority bits of the Frame Control field in the VLAN Identification field and then removes the Frame Control field.

33. The interface circuit of claim 32 wherein the first function reverses the order of each bit in each byte of the Destination Address field of the Token Ring packet to create the Destination Address field of the Ethernet compatible packet.

34. The interface circuit of claim 33 wherein the first function removes the Routing Information Indicator from the Source Address field and reverses the order of each remaining bit of the Source Address field to create the modified Source Address field.

35. The interface circuit of claim 34 wherein the first function creates the VLAN Type field.

36. The interface circuit of claim 35 wherein the first function creates the VLAN Identification field.

37. The interface circuit of claim 36 wherein the first function creates the Length field.

38. The interface circuit of claim 37 wherein the first function determines whether the Token Ring packet is source routed.

39. The interface circuit of claim 38 wherein the Token Ring packet includes a Routing Information Field with a route control field and route descriptor fields, and the first function employs the route control field of the Routing Information Field as the Route Control field of the Ethernet compatible packet and employs the route descriptors of the Routing Information field as the Route Descriptor field of the Ethernet compatible packet, provided the Token Ring packet is determined to be source routed.

40. The interface circuit of claim 39 wherein the first function employs the Routing Information Indicator of the Token Ring packet Source Address field to generate the Route Control field of the Ethernet compatible packet, provided the Token Ring packet is determined not to be source routed.

41. The interface circuit of claim 40 wherein the first function generates a three bit broadcast indicator field to indicate whether the Token Ring packet is source routed.

42. The interface circuit of claim 41 wherein the first function removes the Frame Check Sequence field and generates the new Frame Check Sequence field.

43. The interface circuit of claim 31 wherein the Ethernet network segment is connected to a third segment running the Token Ring network protocol, and wherein the third segment includes a driver which modifies the header portion of the Ethernet compatible packet to generate a header that is compatible with the Token Ring network protocol and removes any existing padding bits from the Information field.

* * * * *